US008665673B2

(12) United States Patent
Zhou et al.

(10) Patent No.: US 8,665,673 B2
(45) Date of Patent: Mar. 4, 2014

(54) CLOCK SHOWER HEAD

(75) Inventors: Huasong Zhou, Xiamen (CN); Jianmin Chen, Xiamen (CN); Xianguo Zou, Xiamen (CN)

(73) Assignees: Xiamen Solex High-Tech Industires Co., Ltd., Xiamen (CN); Huasong Zhou, Xiamen (CN)

( * ) Notice: Subject to any disclaimer, the term of this patent is extended or adjusted under 35 U.S.C. 154(b) by 132 days.

(21) Appl. No.: 13/383,717

(22) PCT Filed: May 27, 2009

(86) PCT No.: PCT/CN2009/072028
§ 371 (c)(1),
(2), (4) Date: Jan. 12, 2012

(87) PCT Pub. No.: WO2010/135869
PCT Pub. Date: Dec. 2, 2010

(65) Prior Publication Data

US 2012/0170424 A1 Jul. 5, 2012

(51) Int. Cl.
*G04B 47/00* (2006.01)
*H02P 9/00* (2006.01)
*B05B 15/00* (2006.01)
*B60Q 1/00* (2006.01)

(52) U.S. Cl.
USPC ....... 368/10; 4/597; 290/54; 362/96; 362/192

(58) Field of Classification Search
USPC .............. 368/10; 4/597; 290/54; 362/96, 192
See application file for complete search history.

(56) References Cited

U.S. PATENT DOCUMENTS

| | | | | | |
|---|---|---|---|---|---|
| 4,564,889 | A * | 1/1986 | Bolson | ......................... | 362/192 |
| 5,140,254 | A * | 8/1992 | Katzman | ......................... | 322/35 |
| 7,387,401 | B2 * | 6/2008 | Clark | ......................... | 362/192 |
| 7,726,832 | B2 * | 6/2010 | Clark | ......................... | 362/192 |
| 2009/0031492 | A1 * | 2/2009 | Foutz et al. | ......................... | 4/597 |
| 2012/0234409 | A1 * | 9/2012 | Klicpera | ......................... | 137/551 |
| 2012/0235408 | A1 * | 9/2012 | Baarman et al. | ................ | 290/43 |

FOREIGN PATENT DOCUMENTS

| | | | |
|---|---|---|---|
| CN | 1931443 | A | 3/2007 |
| CN | 2923040 | Y | 7/2007 |
| CN | 201033312 | Y | 3/2008 |
| CN | 201049323 | Y | 4/2008 |
| JP | 11155932 | A | 6/1999 |

* cited by examiner

*Primary Examiner* — Vit W Miska
(74) *Attorney, Agent, or Firm* — Rabin & Berdo, P.C.

(57) ABSTRACT

A clock shower head includes a hollow body, a hydroelectric generator, a storage battery, a clock processor, a clock displayer and a main control circuit; the hydroelectric generator, the storage battery, the clock processor and the main control circuit are disposed inside the sealing zone of the hollow body. The clock shower head has both illuminating and time display function. People can see the time when enjoying the shower using the clock shower head.

9 Claims, 5 Drawing Sheets

CLOCK SHOWER HEAD

FIELD OF THE INVENTION

The present invention relates to a bath shower head, especially to a clock shower head with a clock display.

BACKGROUND OF THE INVENTION

With the development of the life and the technology, the consumers pay attention to the variety of the function and the novelty of the households. There are luminous shower heads with the water outlet panel disposed with several LED lights. This kind of shower head is powered by the hydroelectric generator inside the shower body or by the external source to make the shower luminous. However, the luminous area of the shower head is limited, with just a point, line or plane; on the other hand, because of the heavy fog and the humidity in the bathroom, a clock, watch or handphone is unsuitable to carry into the bathroom. People won't catch the exact time when they are enjoying a shower, leaving a time dead zone.

SUMMARY OF THE INVENTION

The object of the present invention is to provide with a clock shower head, which solves the problem of the existing technology. The clock shower head has both illuminating and clock display functions, with which people can see the time when enjoying the shower. The present invention solves the problem of the time dead zone in the bathroom, enhancing the enjoyment of the shower.

The proposal technology of the present invention to solve the existing problem is as below:

A clock shower head includes:

a hollow body, disposed with a waterway and a sealing zone inside;

a hydroelectric generator, disposed inside the hollow body, including an impeller and generator disposed inside the generator base;

a storage battery, used to store the energy the generator generates;

a clock processor, used for timing and providing clock signal;

a clock displayer, used to display the time;

a main control circuit, used to read and process the clock signal and control the clock displayer;

a water outlet set, the panel of which is disposed with several transparent water outlets of regular arrangement, the arrangement of the transparent water outlets is coupled to the arrangement of the LED lights;

the power generation of the hydroelectric generator disposed inside the hollow body is driven by the water flow. The electricity of the generator power supplies the clock processor by the storage battery, as well as the main control circuit and the clock displayer; the main control circuit reads the current clock signal by the clock processor to control the clock displayer to display after the signal is processed. Then the LED lights of the clock displayer lights up according to the signal determined by the main control circuit, displaying the current time by filtering through the transparent water outlets.

The clock displayer includes a LED light board, and LED lights and a transparent lampshade; the LED light board is dot array LED light board with at least two sets, the LED light board is assembled on the hollow body, and fixed with the transparent lampshade.

The dot array LED light board has four sets, and the transparent lampshade is disposed with the same amount of raised lamp shells as the LED lights.

The center of the transparent lampshade extends upward with a water pipe to connect hermetically to the bottom of the generator base.

The clock processor and the main control circuit are integrated to a main control base board.

The generator base is divided into a right cavity and a left cavity, a shaft hole is disposed between the two cavities; the generator is assembled inside the left cavity to form a sealing zone, and the input shaft dips into the right cavity through the shaft hole; the impeller is disposed inside the right cavity and connected to the input shaft of the generator, the impeller cover is disposed outside.

The top of the generator base is disposed with a ball base, the bottom of which is opened with an inclined outlet to connect to the right cavity of the generator base; the impeller is vertically placed below the water inlet of the shower head body, the water flow impacts the impeller directly through the inclined outlet to drive the impeller to rotate.

The shower head further includes a key controller to connect to the clock processor with the main control circuit, which has corresponding buttons disposed on the outside of the hollow body.

Unless noted otherwise, the technology and the dialect of science are identical in meaning with the person skilled in the relevant field of technology understands.

With the proposed technology of the present invention, the present invention provides with a clock shower head having both illuminating and clock display. The clock shower head generates electricity from the impact of the water flow, and power is supplied to the storage battery, the clock processor, the main control circuit and the clock displayer. The present invention is structurally simple, energy saving and safe to use. The present invention combines the water outlets of the shower head with the lights filtering through to display the clock.

DETAILED DESCRIPTION OF THE EMBODIMENTS

The present invention is further described with the drawings and the preferred embodiments:

The First Embodiment

Figure 1:
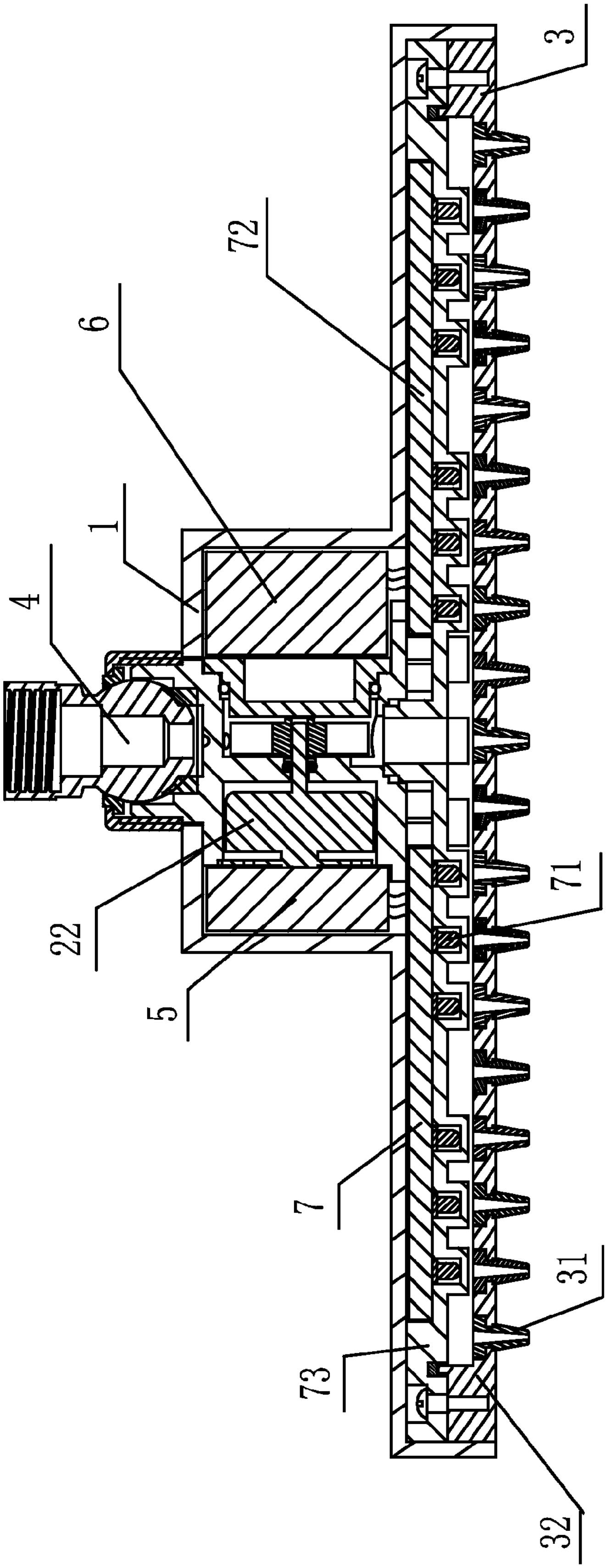
FIG. 1 illustrates the cross section view of the clock shower head in the first embodiment.
Figure 5:
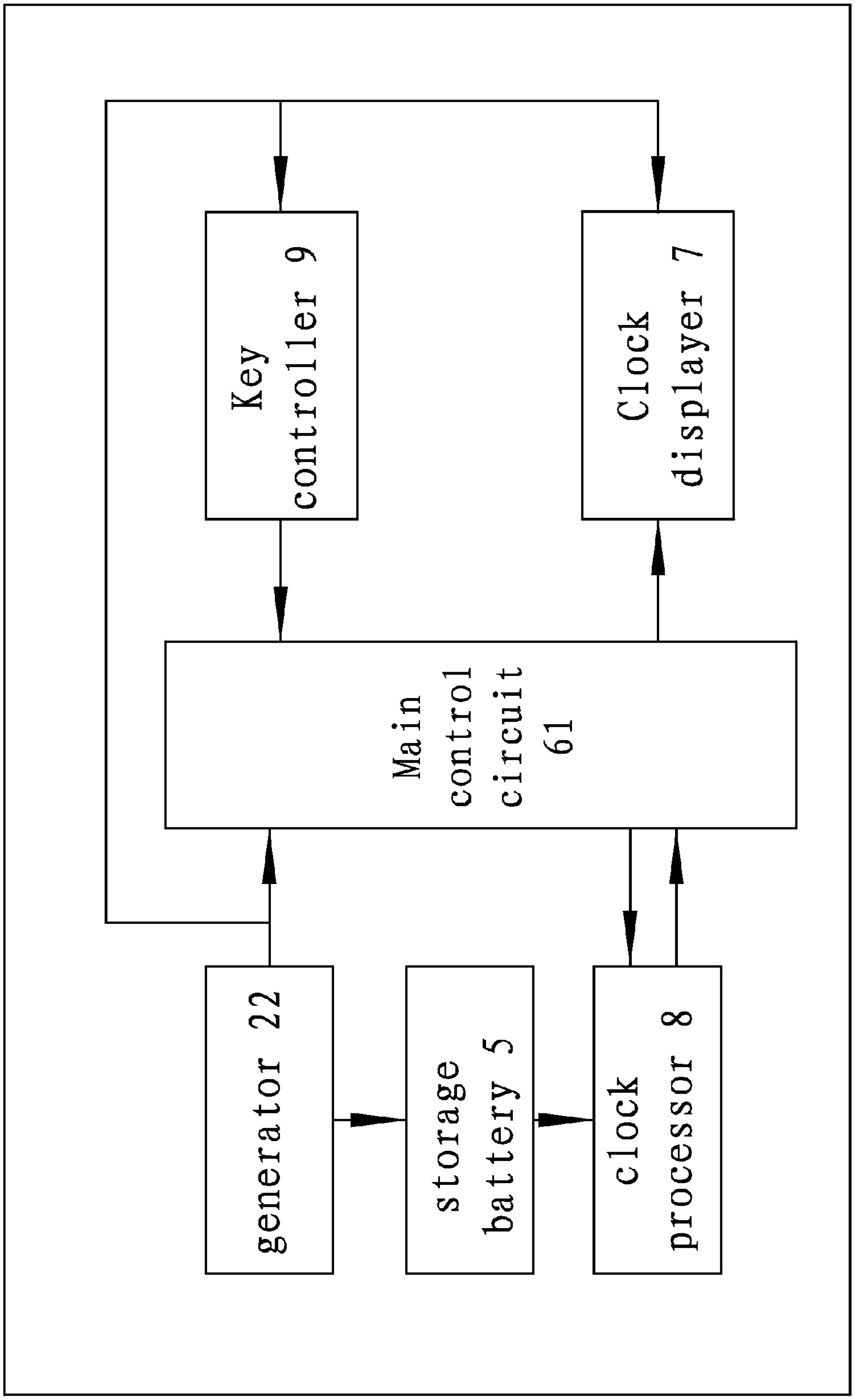
FIG. 5 illustrates the schematic diagram in the first embodiment.

As shown in FIG. 1 and FIG. 5, the present invention of a clock shower head includes: a hollow body 1, a hydroelectric generator 2, a spherical joint 4, a storage battery 5, a clock processor 8, a clock displayer 7, a main control base board 6, a key controller 9 and a water outlet set 3.

Figure 3:
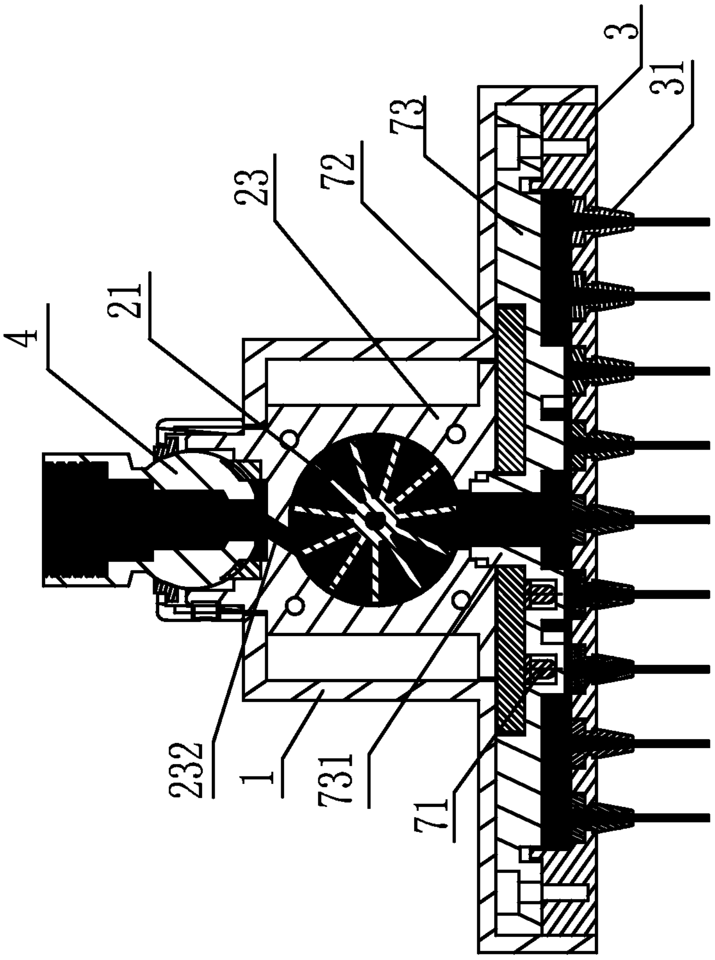
FIG. 3 illustrates the impact of the water in the first embodiment.
Figure 4:
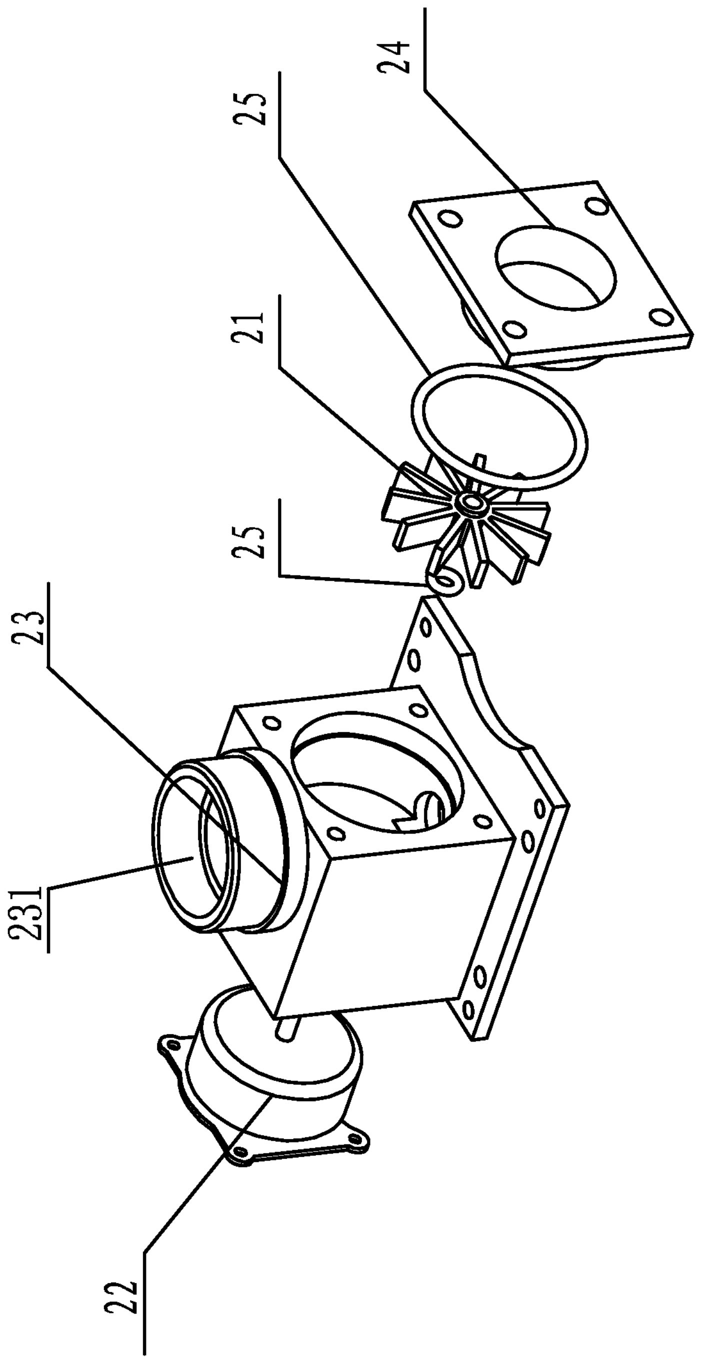
FIG. 4 illustrates the structure of the hydroelectric generator in the first embodiment.

The hollow body 1, disposed with a waterway and a sealing zone inside;

The spherical joint 4, disposed on the top of the hollow body 1, to control the quantity of the water outlet;

the hollow body 1, as shown in FIG. 1, FIG. 3 and FIG. 4; the hydroelectric generator 2 includes an impeller 21, a generator 22, a generator base 23, an impeller cover 24, a sealing ring 25; the generator base 23 is divided into two cavities, the right cavity and the left cavity. There is a shaft hole between the right and left cavity; the generator 22 is disposed inside the left cavity of the generator base 23, which is formed into a sealing zone. The input shaft dips into the right cavity through the shaft hole; the impeller 21 is disposed inside the right cavity and connected to the input shaft of the generator 22; and the impeller cover 24 is disposed outside the right cavity;

A ball base 231 for the spherical joint 4 is disposed on the top of the generator base 23, the bottom of the seat is opened with an inclined outlet 232, which is connected to the right cavity of the generator base 23; the impeller 21 is vertically placed below the water inlet of the hollow body 1, the water flow impacts the impeller 32 directly through the inclined outlet 232 and drives the impeller 21 rotate. The impeller 21 drives the generator 22 work.

Figure 2:
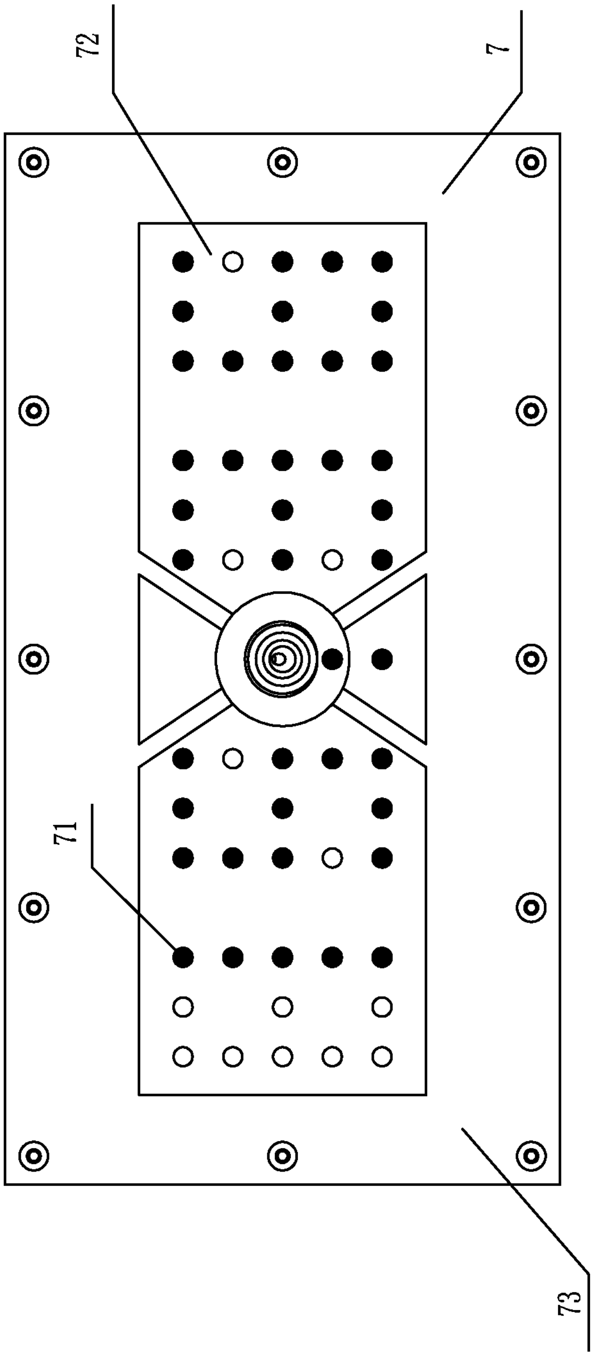
FIG. 2 illustrates the structure of the LED light board in the first embodiment.

A storage battery 5, used to store energy generated from the hydroelectric generator 2;

A clock processor 8, driven by the electric energy of the storage battery 5, for timing and providing the clock signal, the clock processor 8 is disposed on the main control base board 6;

A clock displayer 7 includes a LED light board 72, LED lights 71 and a transparent lampshade 73. The LED light board 72 is dot array LED light board with 4 sets. Two of them display the hours, the other two display the minutes, there are two LED lights 71 used as the symbol at the center, as shown in FIG. 2. The black dots represent the lit-up LED light, and the clock displays 15:36. The LED light board 72 is disposed on the hollow body 1 and pass through the transparent lampshade 73; the central of the transparent lampshade is extending upward with a water pipe 731 to connect hermetically to the bottom of the generator base 23; the clock displayer is powered directly by the hydroelectric generator 2.

A main control base board 6, the main control circuit 61 is powered by the hydroelectric generator 2, and reads the current clock signal first from the clock processor 8 when powered, the clock signal is output to the clock displayer 3 after processed; the main control base board 6 is disposed inside the sealing zone of the hollow body 1;

A key controller 9, which is powered directly by the hydroelectric generator, used to control and adjust the clock; the key controller 9 is disposed outside the hollow body 1 (not figured in the drawings);

A water outlet set 3, the panel cover 32 of which is disposed with several transparent water outlets 31 of regular arrangement, the arrangement of the transparent outlets 31 is couples to the arrangement of the LED lights 71. Every LED light 71 corresponds to a transparent outlet 31; the transparent lampshade 73 and the panel cover 32 are formed into a water inlet cavity; the transparent outlet 31 is used for water outlet and clock display.

When working: the water flow from the spherical joint 4 impacts the impeller 21 directly through the inclined outlet 232, making the impeller 21 drive the hydroelectric generator 22; the energy from the generator 22 is supplied to the battery 5 to power the clock processor 8, making sure the clock chip of the clock processor 8 has continuous energy; energy is also supplied to the main control circuit 61, the clock displayer 7 and the key controller 9, the main control circuit 61 reads the current clock signal from the clock processor 8 after powering on and controls the work of the clock displayer 7 after the signal is processed. The LED lights 71 on the LED light board 72 light up according to the signal determined by the main control circuit, displaying the current time by filtering through the transparent water outlets. At the same time, the water in the pipe enters into the water inlet cavity through the water pipe 731 then flows out from the transparent water outlets 31.

The clock processor 7, the main control circuit 61 and the key controller 9 are existing technologies, which will not be described here.

Although the present invention has been described with reference to the preferred embodiments thereof for carrying out the invention, it is apparent to those skilled in the art that a variety of modifications and changes may be made without departing from the scope of the present invention which is intended to be defined by the appended claims.

INDUSTRIAL APPLICABILITY

The present invention of a clock shower head integrates the shower and the clock. First, the clock is powered by the hydroelectric generation from the water flow; second, the outlets of the shower for the light to display the detailed clock. The present invention is well designed and easy to use with industrial applicability.

What is claimed is:

1. A clock shower head, wherein includes:

A hollow body, disposed with a waterway and a sealing zone inside;

a hydroelectric generator, disposed inside the hollow body, including an impeller and a generator, both disposed inside of a generator base;

a storage battery, used to store the energy the generator generates;

a clock processor, used for timing and providing clock signal;

a clock displayer, used to display the time;

a main control circuit, used to read and process the clock signal and control the clock displayer;

a water outlet set, a panel of which is disposed with several transparent water outlets of regular arrangement, the arrangement of the transparent water outlets is coupled to an arrangement of LED lights;

the power generation of the hydroelectric generator disposed inside the hollow body is driven by a water flow; the electricity of the generator power supplies the clock processor by the storage battery, as well as the main control circuit and the clock displayer; the main control circuit reads the current clock signal by the clock processor to control the clock displayer to display after the signal is processed; then the LED lights light up according to the signal determined by the main control circuit, displaying the current time by filtering through the transparent water outlets.

2. The clock shower head according to the claim 1, wherein the clock displayer includes a LED light board, said LED lights and a transparent lampshade; the LED light board is a dot array LED light board with at least two sets, the LED light board is assembled on the hollow body, and fixed with the transparent lampshade.

3. The clock shower head according to the claim 2, wherein the dot array LED light board has four sets, and the transparent lampshade is disposed with the same amount of raised lamp shells as the LED lights.

4. The clock shower head according the claim 2, wherein the center of the transparent lampshade extends upward with a water pipe to connect hermetically to the bottom of the generator base.

5. The clock shower head according to the claim 1, wherein the clock processor and the main control circuit are integrated to a main control base board.

6. The clock shower head according to the claim 1, wherein the generator base is divided into a right cavity and a left cavity, a shaft hole is disposed between the two cavities; the generator is assembled inside the left cavity to form a sealing zone, and an input shaft dips into the right cavity through the shaft hole; the impeller is disposed inside the right cavity and connected to the input shaft of the generator, an impeller cover is disposed outside.

7. The clock shower head according to the claim 6, wherein the top of the generator base is disposed with a ball base, the bottom of which is opened with an inclined outlet to connect to the right cavity of the generator base; the impeller is vertically placed below a water inlet of the shower head body, the water flow impacts the impeller directly through the inclined outlet to drive the impeller to rotate.

8. The clock shower head according to the claim 1, wherein the shower head further includes a key controller to connect to the clock processor with the main control circuit, which has corresponding buttons disposed on the outside of the hollow body.

9. The clock shower head according the claim 3, wherein the center of the transparent lampshade extends upward with a water pipe to connect hermetically to the bottom of the generator base.

* * * * *